June 2, 1931.  G. K. W. JOHANSSON  1,808,114
APPARATUS FOR AUTOMATICALLY ESTABLISHING A
PULSATING MOTION OF AIR IN TWO CONDUITS
Filed Nov. 21, 1929
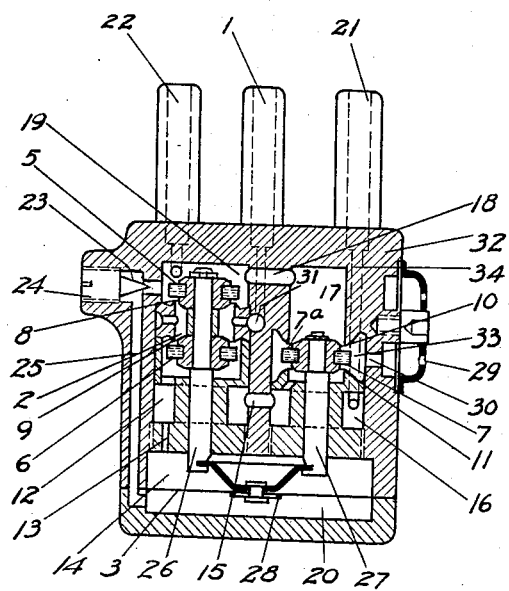
G. K. W. Johansson
INVENTOR
By: Marks & Clerk
Attys.

UNITED STATES PATENT OFFICE

GEORG KARL WILHELM JOHANSON, OF LIDINGO, SWEDEN, ASSIGNOR TO SVENSKA AKTIEBOLAGET GASACCUMULATOR, OF LIDINGO, SWEDEN

APPARATUS FOR AUTOMATICALLY ESTABLISHING A PULSATING MOTION OF AIR IN TWO CONDUITS

Application filed November 21, 1929, Serial No. 408,858, and in Sweden December 8, 1928.

This invention relates to an apparatus for automatically establishing a pulsating motion of air in two conduits, in which each of the conduits is connected with a vacuum conduit and an atmospheric conduit, by means of two valves, controlled by diaphragms, the arrangement being such that one of the valves is closed, when the other valve is open.

Such apparatus may be applied to milking machines, but I do not confine my claims thereto, as I wish to protect my invention whenever used.

In some known constructions of such apparatus, the arrangement is such that the valve in the vacuum conduit or in the atmospheric conduit is kept on its seat by the action of a diaphragm against the action of a vacuum pressure or an atmospheric pressure on the opposite side of the valve, tending to open the valve. In consequence thereof the diaphragms must be given large dimensions to secure good contact between the valve and its seat, and the whole apparatus therefore has been comparatively large and expensive. According to the invention the arrangement of the valves and the vacuum and atmospheric chambers in which they are working is such that the valves are kept closed by means of atmospheric pressure, whereas the diaphragms are only used to perform the reversing motion of the valves without exercising any appreciable pressure on the valves for their abutment against the valve seats. This fact enables a reduction of the diaphragm area and a simpler construction, in that one single diaphragm actuating the valves may be used. According to one construction of the invention two valve spindles independent of one another are actuated by said single diaphragm. One of the valve spindles according to one embodiment carries two valves, separated from one another, and controlling the communication between a vacuum chamber provided between the valves and the two conduits, in which conduits vacua and atmospheric pressure alternately are to prevail; whereas the other valve spindle carries a double valve placed in the atmospheric chamber. The two valve spindles may be connected with the common diaphragm by means of a yielding or flexible member, whereby the valves will close independently. Or the diaphragm itself may constituute such yielding or flexible connection with the spindles.

An embodiment of the invention is illustrated in vertical section on the drawing.

1 indicates the vacuum conduit, which is in constant communication by means of a channel 31 with a chamber 2 surrounding the common spindle of two valves 5 and 6 and provided between said valves, of which the valve 5 is adapted to co-operate with the valve seat 8 in its lower position, whereas the valve 6 is adapted to co-operate with the valve seat 9 in its upper position. The vacuum chamber 2 may thereby be put into or out of communication with a chamber 19, above the valve 5, communicating with the conduit 22; and into or out of communication with a chamber 12 beneath the valve 6, said chamber communicating through a narrow channel 13 with the chamber 14 above the diaphragm 3.

An air inlet 29 is provided in the wall 32 of the casing of the apparatus and communicates through a channel 30 with a chamber 33, provided with upper and lower valve seats 10 and 11 for a double valve 7, 7a, mounted on a valve spindle 27. The chamber 33 may be brought into or out of communication with a chamber 17 above the valve by means of the movements of the valve, said chamber communicating through a channel 18 with the chamber 19; and also into or out of communication with a chamber 16 beneath the valve, said chamber 16 communicating with the chamber 12 through a channel 15 and also with the conduit 21 through a channel 34. A channel 25 in the wall 32 of the casing of the apparatus opens at its lower end into the chamber 20 beneath the diaphragm 3, and opens at its upper end into the chamber 19 over a throttling device 23, which is adjustable by means of a screw 24. Both valve spindles 26 and 27 extend into the chamber 14 above the diaphragm 3 and are connected with said diaphragm 3 by means of a connecting member such as a plate 28 or the like, so that the two spindles 26 and 27 with their valves 5, 6, 7, 7a are moved simultaneously with the diaphragm. The valve spindles 26, 27 are independent of one another, to the extent that the valves carried by the spindles may independently occupy the necessary closed positions owing to the flexibility of the diaphragm 3, which would not be the case if all valves were mounted on a common spindle.

The apparatus is worked in the following manner:—

In the lower position of the diaphragm 3 the valve 5 rests upon the valve seat 8 and closes the communication between the vacuum chamber 2 and the chamber 19, whereas communication is opened through the valve 6 between said vacuum chamber 2 and the chamber 12. The vacuum is transmitted to the chamber 16 through the channel 15, said chamber being closed against the atmospheric chamber 33, as the valve 7 simultaneously with the valve 5 occupies its lower position and rests against the valve seat 11. Through the channel 34 the vacuum chamber 16 is connected to the conduit 21, in which vacuum will prevail.

Simultaneously herewith atmospheric air flows through the air inlet 29 in the chamber 33 over the valve 7a to the chamber 17 and from this through the channel 18 to the chamber 19 and the conduit 22. Thus vacuum is now prevailing in the conduit 21 and atmospheric pressure in the conduit 22, and both valves are held tightly closed partly by the atmospheric pressure on their upper surface, partly by the vacuum on their lower surface.

When the valves 5 and 7 are thus held in their lower positions the atmospheric pressure is gradually transmitted by means of throttling device 23, through the channel 25 to the chamber 20 beneath the diaphragm 3, in which chamber, as stated below, vacuum prevails; while the vacuum chamber 12 is connected to the chamber 14 above diaphragm 3 through a narrow opening 13. At maximum atmospheric and vacuum pressure in said chambers 20 and 14 respectively the diaphragm 3 will move upwards, reversing the positions of the valves 5, 6, 7, 7a against the action of the atmospheric pressure on the upper surface of the valves 5 and 7a. The vacuum chamber 2 now is put in communication with the chamber 19 through the opened valve 5, so that vacuum will prevail in the conduit 22, where previously atmospheric pressure existed, and atmospheric pressure is introduced into the chamber 16 over the valve 7, now opened, and is transmitted from said chamber 16 through the channel 34 to the conduit 21, so that atmospheric pressure will now exist there instead of vacuum. In the position of the valves just described, the valves are kept tightly closed by the atmospheric pressure acting upon the lower surfaces of the valves, while simultaneously vacuum exists over the upper surfaces of the valves.

The atmospheric pressure prevailing in the chamber 20 beneath diaphragm 3 is gradually reduced to vacuum as the air escapes through the channel 25 and the throttling device 23 to the chamber 19, whereas atmospheric pressure is transmitted from the chamber 16 through the channel 15 to the chamber 12 and from said chamber through the opening 13 to the chamber 14 above the diaphragm 3, in which chamber vacuum pressure was previously prevailing. When the pressures on opposite sides of the diaphragm 3 reach a maximum, the diaphragm is reversed, and also the valves 5, 6, 7, 7a against the action of the atmospheric pressure on the valves 6 and 7. The operation is then repeated.

It will be clear from the above description, that atmospheric pressure prevails on the upper surfaces of the valves 5 and 7 in their closed position, which pressure exercises the necessary constant pressure for establishing a tight abutment of the valves against their valve seats. When the valves 6 and 7a are closed atmospheric pressure is also prevailing upon the lower surfaces of the valves, establishing a tight abutment of the valves against their seats. The diaphragm 3 therefore only needs a small movement to reverse the valves, and they may therefore be constructed with relatively small dimensions. It is clear that in a modification one diaphragm may be used for the valves 5, 6 and another diaphragm for the valves 7, 7a.

Having now described my invention, what I claim as new and desire to secure by Letters Patent is:—

1. In an apparatus for automatically establishing a pulsating motion of air in two conduits, a vacuum chamber and an atmospheric chamber, each provided with a valve, a diaphragm and a member for connecting the one side of the diaphragm with the said valves.

2. In an apparatus for automatically establishing a pulsating motion of air in two conduits, a vacuum chamber and an atmospheric chamber, each provided with two valves mounted on a common spindle, a diaphragm and a flexible member for connecting the one side of the diaphragm with the spindles of said valves.

3. In an apparatus for automatically establishing a pulsating motion of air in two conduits, a vacuum chamber and an atmospheric chamber, two valve spindle independent of one another connected to a single reciprocating diaphragm, one of the valve spindles carrying two valves, controlling communication between the vacuum chamber placed between the valves and the two conduits, whereas the other valve spindle carries a double valve, placed in the atmospheric chamber.

4. In an apparatus for automatically establishing a pulsating motion of air in two conduits, a vacuum chamber and an atmospheric chamber, two valves mounted on the same spindle in said vacuum chamber, valve seats in said vacuum chamber, adapted to cooperate with the said valves, said valve spindle being independent of a second spindle carrying valves in the atmospheric chamber.

5. In an apparatus for automatically establishing pulsating motion of air in two conduits, a vacuum chamber and an atmospheric chamber, each provided with a valve, and a common diaphragm for actuating, said valves in the same direction.

6. In an apparatus for automatically establishing a pulsating motion of air in two conduits, a vacuum chamber and an atmospheric chamber, two valve spindles independent of one another, one carrying valves in the vacuum chamber and the other carrying valves in the atmospheric chamber, and a single diaphragm connected to both valve spindles.

In testimony whereof I have signed my name to this specification.

GEORG KARL WILHELM JOHANSON.